United States Patent Office 3,825,522
Patented July 23, 1974

3,825,522
PROCESS FOR THE PREPARATION OF SELF-EXTINGUISHING EPOXY RESINS
Silvio Vargiu, Sesto San Giovanni, and Mario Pitzalis, Arcore, Italy, assignors to Società Italiana Resine S.I.R. S.p.A., Milan, Italy
No Drawing. Filed Dec. 11, 1972, Ser. No. 313,904
Claims priority, application Italy, Dec. 27, 1971, 32,946/71
Int. Cl. C08g 30/04
U.S. Cl. 260—47 EP
12 Claims

ABSTRACT OF THE DISCLOSURE

Solid and self-extinguishing epoxy resins having high epoxy equivalent values and which produce solutions having low viscosity levels, are prepared by a process which consists essentially in reacting bisphenol A with an intermediate epoxy product obtained by dehydrochlorinating the products of reaction between epichlorohydrin and hydroxylated derivatives of halogenated diphenyls or diphenyl methanes.

---

The present invention relates to a new class of self-extinguishing epoxy resins with high values of epoxy equivalent, and to a process for their manufacture.

The term epoxy resin generally means those resinous products having more than one epoxy group per molecule, which are hardened by interaction of the epoxy groups with suitable hardening agents.

It is well-known that epoxy resins are obtained industrially by reaction between polyphenols and halohydrins. Normally used for the purpose are 2,2′-bis(4-oxyphenyl) propane (bisphenol A) and epichlorohydrin, and epoxy resins are prepared which have high values of epoxy equivalent, using a two-stage process.

More precisely, in a first reaction stage, an intermediate epoxy product is prepared from epichlorohydrin and bisphenol A in the presence of caustic soda in equivalent quantity with respect to the epichlorohydrin.

Thus, an intermediate epoxy product is obtained which is caused to react with a further quantity of bisphenol A until epoxy resins are obtained which have values of epoxy equivalent in excess of approximately 1,000. In order to impart self-extinguishing properties to the said resins, the bisphenol A can be wholly or partly replaced by the corresponding halogenated products.

For this purpose, the brominated derivatives of bis-phenol A, such as for example beta-beta′-bis(3,5-dibromo-4-oxyphenyl)propane, or the chlorinated derivatives such as for example beta, beta′-bis(3,5-dichloro-4-oxyphenyl) propane, may be used.

The epoxy resins which have a high value of epoxy equivalent are used above all in the field of protective coatings, varnishes, adhesives and for the impregnation of fibres, or in printing compositions together with resin products of the phenol or amine type.

The most significant features of the epoxy resins, with regard to their applicability in such fields, are essentially:

the epoxy equivalent defined as the quantity of resin, in grams, containing one epoxy group;
the viscosity of the resin itself if liquid or of its relative solutions if it is solid.

The viscosity of the resin or of its relative solutions gives a measure of the ease with which the said resin may be used.

In fact, the lower the viscosity, the more easily the resin is spread, sprayed or poured and the greater is its power of impregnation. The epoxy equivalent of an epoxy resin indicates the rate at which the actual resin hardens, in the sense that the greater the epoxy equivalent, the more slowly the resin hardens when treated with a given hardening agent.

Furthermore, as is well-known, the characteristics of flexibility and elasticity as well as the adhesive properties of the hardened product increase with the rise in epoxy equivalent.

On the basis of the foregoing description, it is evident that it would be useful to have available epoxy resins which have low viscosity levels together with high levels of epoxy equivalent.

However, this condition is not met in the currently known epoxy resins, in which high epoxy equivalent values are matched by rather high viscosity levels, which represents a limitation on the practical use or at least creates various difficulties in actual usage. It has now been found possible to avoid or at least substantially to reduce the disadvantages described by using a new type of epoxy resin. An object of the present invention, therefore, is to provide epoxy resins which have a high level of epoxy equivalent and a low level of viscosity. A further object of the present invention is to provide epoxy resins which also have self-extinguishing characteristics.

A further object of the present invention is to suggest a process for the preparation of the said resins. Other objects of the invention will become apparent from the following description.

According to the process of the present invention, solid and self-extinguishing epoxy resins having high epoxy equivalent values and which produce solutions having low viscosity levels, are prepared by a process which consists essentially in reacting bisphenol A with an intermediate epoxy product obtained by dehydrochlorinating the products of reaction between epichlorohydrin and a halogenated and hydroxylated products belonging to the following classes of compound

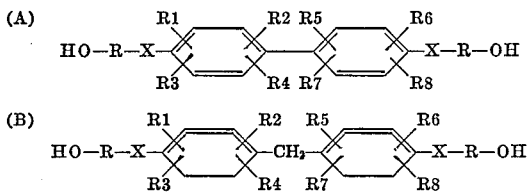

in which:

R1 represents chlorine or bromine;
R2, R3, R4, R5, R6, R7, R8 represent hydrogen or chlorine or bromine;
X represents nitrogen or oxygen;
R represents an alkylene radical containing from 2 to 8 carbon atoms.

Examples of compounds belonging to such a class are: bis(diethyleneglycol)octochlorodiphenyl; N,N′ - di(ethan-2-ol)diamino-octochlorodiphenyl; the diols derived from decachlorodiphenyl, for example by reaction with glycols or with amino alcohols; the diols derived from octochloro-dihydroxydiphenyl; the diols derived from tetrabromodi-phenylmethane; the diols derived from tetrabromodianili-nomethane.

The said monomers will be generically referred to as "halogenated monomers" during the course of the present description.

Thus, according to the process of the present invention, the halogenated monomer and epichlorohydrin are first caused to react in the presence of an alkylation catalyst, particularly boron trifluoride, preferably in the form of etherated boron trifluoride.

More particularly, in this phase of reaction, the working temperature ranges from approximately 130° C. to 150° C., the epichlorohydrin being added slowly to the reagent mixture. In practice, the halogenated monomer is charged into the reaction vessel and boron trifluoride or other alkylation catalyst is added in quantities of 0.01 to 0.5% by weight with respect to the halogenated monomer itself. Then, the epichlorohydrin is added over a period ranging from 8 to 16 hours, up to a total quantity of 3.0 to 6.5 moles for every mole of halogenated monomer, and during this period of time, the thermal effects of the reaction are monitored so as to maintain the temperature within the range of values described. At the end of the reaction, an inorganic base is added to the mass, normally sodium or potassium hydroxide, in solid sub-divided form and in quantities of 2 to 3 moles for every mole of halogenated monomer. The inorganic base is dispersed homogeneously and is maintained in contact for a period of 4 to 8 hours at a temperature preferably of the order of 130 to 140° C. At the end of the treatment, the mixture is subjected to extraction by means of an organic solvent such as toluene, xylene or acetone and from the extracted phase, the solvent is then evaporated, working at below atmospheric pressure.

Thus, a residue is separated which consists of an intermediate epoxy product having characteristics which fall within the following ranges of values.

Epoxy equivalent: 550 to 650;
Viscosity at 25° C., at 40% in butyl Carbitol: 150 to 250 cps.;
Gel time: 30 to 60 minutes.

It should be noted that the gel time is determined by homogenising 100 parts by weight of resin and 3 parts by weight of triethylenetetramine at 60° C. The mixture comprising resin and hardener is maintained at 60° C. until it assumes a gelatinous appearance. The gel time is the time elapsing between homogenisation of the resin with the hardener at 60° C. and the time when the mixture assumes a gelatinous consistency.

According to the method of the present invention, this intermediate product is caused to react with bisphenol A in order to obtain a solid epoxy resin with an epoxy equivalent above approximately 2,000, which produces solutions having low viscosity levels.

More particularly, from 10 to 30 parts by weight of bisphenol A per every 100 parts by weight of the intermediate epoxy product are homogenised and this is caused to react by working at temperatures from 150° to 180° C. for periods from 2 to 4 hours.

The reaction is furthermore catalysed by tertiary amines or quaternary ammonium bases which are added in quantities of 0.2 to 1% by weight with respect to the intermediate epoxy product.

It is preferable to add the catalyst slowly during the reaction between the intermediate epoxy product and the bisphenol A, for example in periods ranging from 20 to 80 minutes.

Among the catalysts which belong to the said classes, particularly useful for the purpose are benzyldimethylamine, trimethylamine, tetraethylammoniumhydroxide and benzyltrimethylammoniumhydroxide.

In this way, a solid epoxy resin with a low melting point is obtained, its characteristics being comprised within the following ranges of values:

Epoxy equivalent: 2,500 to 5,000
Melting temperature (capillary): 45 to 60° C.
Viscosity at 25° C. with 40% butyl Carbitol: 80 to 160 cps.

The epoxy resins prepared according to the process of the present invention have self-extinguishing characteristics which are a function of the quantity of halogen bonded to the halogenated monomer.

Furthermore, such resins become solid at ambient temperature with a low melting point due to the fact that they melt at temperatures of approximately 45 to 60° C.

The epoxy equivalent of the resins of the present invention is high and generally higher than approximately 2,000. The solubility of such resins in normal solvents used is high and the solutions produced have low values of viscosity.

Thus, for example, an epoxy resin obtained according to the process of the present invention, having an epoxy equivalent equal to approximately 3,000, has a viscosity of the order of 85 cps. at 25° C. in a 40% butyl Carbitol solution.

An epoxy resin of the prior art, obtained from bisphenol A and epichlorohydrin according to the process previously mentioned, in which there are two stages, the product having an epoxy equivalent equal to approximately 3,000, generally has a viscosity level of around 3,000 to 9,000 cps. at 25° C. in a 40% butyl Carbitol solution. The epoxy resins of the present invention are particularly useful in impregnation of for example glass or paper fibres, or for forming laminates with self-extinguishing properties.

They are also useful in protective coatings and offer the following advantages over the resins of the prior art:

less use of solvents due to the high fluidity of the resin; possibility of formulating varnishes of considerable thickness by using a small quantity of solvent mixture;
use of substantial quantities of filler.

Example 1

Into a flask fitted with an agitator, reflux cooler and a thermometer are placed 638 g. bis(diethyleneglycol) octochlorodiphenyl) which are heated in a stream of nitrogen to a temperature of approximately 140° C. After approximately 10 minutes, 2.0 g. boron trifluoride in the form of boron trifluoride etherate are added, and the mixture is completely homogenised. 400 g. epichlorohydrin are added over a period equal to approximately 10 hours, the thermal effects being monitored while the temperature is maintained at the level stated. Then, while the mixture is maintained at 130 to 140° C., 92 g. of sodium hydroxide in the form of a solid powder are added and the mixture maintained at the said temperature for approximately 5 hours. Then, the reaction mass is extracted with xylene and finally the xylene is evaporated, a pressure being maintained which is below ambient pressure.

In this way, a liquid epoxy product is obtained which has the following characteristic features:

Epoxy equivalent: 570 to 620
Viscosity at 25° C., in 40% butyl Carbitol: 150 to 200 cps.
Gel time at 40° C.: 3 to 4 hours Example 2

Into a flask fitted with an agitator, cooler and thermometer are placed 400 g. of the resin described in Example 1.

While it is being stirred and kept in a stream of nitrogen, the mass is heated to 120 to 130° C.

Then, 50 g. bisphenol A are added in finely sub-divided form and the mixture is heated up to approximately 150° C. Then, over 35 minutes, 2.1 g. of benzyldimethylamine are added while the epoxy equivalent and the melting point of the epoxy resin are monitored until constant. Thus, an epoxy resin is obtained which has tthe following characteristics:

Epoxy equivalent: 3,100
Melting point (capillary): 46° C.
Viscosity at 25° C., 40% butyl carbitol: 85 cps.

Example 3

Into a flask fitted with an agitator, cooler and thermometer are placed 450 g. of the epoxy product prepared in Example 1.

The mass is heated while being stirred and kept in a current of nitrogen, to a temperature of 130 to 140° C.

Then, 60 g. finely sub-divided bisphenol A are added and the mixture heated to 160° C. and, while the temperature is being maintained, 3.5 g. benzyldimethylamine are added over a period of 50 minutes.

During this period, the epoxy equivalent of the resin is monitored together with the melting point, until these values are constant.

Thus, an epoxy resin is obtained which has the following characteristic features:

Epoxy equivaent: 3,230
Melting point (capillary): 52° C.
Viscosity at 25° C., in 40% butyl Carbitol: 110 cps.

Example 4

Into a flask fitted with an agitator, cooler and thermometer are placed 500 g. of the liquid epoxy product prepared as described in the first Example. The mass is heated under agitation and in a stream of nitrogen up to a temperature of 160° C. 95 g. of bisphenol A are added in finely sub-divided form and the mass is heated up to 180° C. 5 g. of benzyldimethylamine are added in 80 minutes, the temperature being maintained at the said level and during this period the characteristic features of the resin are monitored until they are constant. Thus, an epoxy resin is obtained which has the following characteristic features:

Epoxy equivalent: 2,450
Melting point (capillary): 58 to 60
Viscosity at 25° C., in 40% butyl Carbitol: 145 cps.

Example 5

Into a flask fitted with an agitator, reflux cooler and thermometer are placed 450 g. of the epoxy product obtained in the first example.

The mass is heated under agitation and in a stream of nitrogen to a temperature of 120 to 130° C. Then, 75 g. of bisphenol A are added and the mixture heated up to 150° C. Then, 3 g. of benzyldimethylamine are added in 35 minutes, the said temperature being maintained. The progress of reaction is monitored, the epoxy equivalent being measured during the time, and the melting point is also monitored, which is continued until the said values in the products of reaction are constant. Thus, an epoxy resin is obtained which has the following characteristics:

Epoxy equivalent: 3,200
Melting point (capillary): 56° C.
Viscosity at 25° C. in 40% butyl Carbitol: 90 cps.

What we claim is:

1. Process for the preparation of solid self-extinguishing hardenable epoxy resins having values of epoxy equivalent in excess of approximately 2,000 and having low values of viscosity, characterised:

by the preparation, in a first stage of reaction, of an intermediate epoxy product having an epoxy equivalent of 550 to 650 by reaction of a halogenated monomer belonging to the following classes of compound:

(A) 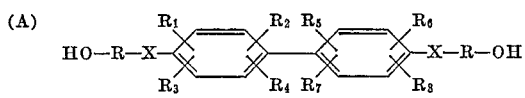

(B) 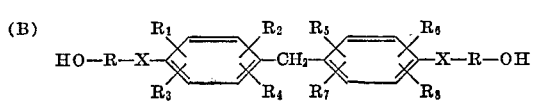

in which $R_1$ represents chlorine or bromine; $R_2$, $R_3$, $R_4$, $R_5$, $R_6$, $R_7$, $R_8$ represent hydrogen or chlorine or bromide; X represents nitrogen or oxygen; and R represents an alkylene radical containing from 2 to 8 carbon atoms with epichlorohydrin in the presence of an alkylation catalyst, followed by treatment with an inorganic base and extraction of the resultant epoxy product with a solvent;

by, in a second stage of reaction, reacting the intermediate epoxy product, after separation of the solvent, with quantity of 10 to 30 parts by weight of 2,2'-bis(4-oxyphenyl)propane for every 100 parts by weight of the said intermediate product, at a temperature of 150 to 180° C. and for periods ranging from 2 to 4 hours in the presence of catalytic quantities of an organic compound chosen from among the tertiary amines and quaternary ammonium bases.

2. Process according to Claim 1, characterised in that the halogenated monomer used is: bis(diethyleneglycol) octochlorodiphenyl; N,N'-di(ethan-2-ol) - diamino - octochlorodiphenyl, or the diols derived from the following compounds: decachlorodiphenyl, octochlorodihydroxydiphenyl, tetrabromodiphenylmethane, tetrabromodianilinomethane.

3. Process according to Claim 1, characterised in that in the first stage of reaction the working temperatures range from 130 to 150° C. over a period ranging from 8 to 16 hours, with a molar ratio of epichlorohydrin to halogenated monomer of 3.0:1 to 6.5:1, the reaction being carried out in the presence of a quantity of 0.01 to 0.05% by weight with respect to the halogenated monomer, of an alkylation catalyst.

4. Process according to Claim 1, characterised in that the alkylation catalyst is boron trifluoride.

5. Process according to Claim 1, characterised in that in the first stage of reaction, an inorganic base, is used in quantities of 2 to 3 moles for every mole of halogenated monomer, the working temperatures being from 130 to 140° C., the reaction time ranging from 4 to 8 hours.

6. Process according to Claim 1, characterised in that in the second stage of reaction, a quantity of catalyst is used ranging from 0.2 to 1.0% by weight with respect to the intermediate epoxy product.

7. Process according to Claim 6, in which the said catalyst is chosen from the group of compounds consisting of: benzyldimethylamine, trimethylamine, tetraethylammoniumhydroxide and benzyltrimethylammonium hydroxide.

8. Process according to Claim 4, characterised in that the boron trifluoride is in the form of boron trifluoride etherate.

9. Process according to Claim 5, characterised in that the inorganic base is sodium or potassium hydroxide.

10. Process according to Claim 7, in which the said catalyst is benzyldimethylamine.

11. Process according to Claim 1, characterised in that the epoxy resins have values of epoxy equivalent in the range of 2,500 to 5,000 and a melting temperature (capillary) of 45 to 60° C.

12. Process according to Claim 11, in which said epoxy resins have a viscosity at 25° C. of 80 to 160 cps. with 40% butyl Carbitol.

References Cited
UNITED STATES PATENTS 3,244,731   4/1966   Winfield _____ 260—47 X
3,277,058   10/1966  Sonnabend _____ 260—47

WILLIAM H. SHORT, Primary Examiner

T. E. PERTILLA, Assistant Examiner

U.S. Cl. X.R.

260—348.6